US007357980B2

(12) United States Patent
Konno et al.

(10) Patent No.: US 7,357,980 B2
(45) Date of Patent: Apr. 15, 2008

(54) NONMAGNETIC POWDER COMPRISING ACICULAR IRON AND HAVING SPECIFIC POROSITY FOR A MAGNETIC RECORDING MEDIUM, METHOD OF MANUFACTURING SAME, AND MAGNETIC RECORDING MEDIUM USING SAME

(75) Inventors: Shinichi Konno, Honjo (JP); Kenichi Inoue, Hirosaki (JP); Toshihiko Ueyama, Okayama (JP); Ken Inoue, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 253 days.

(21) Appl. No.: 11/206,862

(22) Filed: Aug. 19, 2005

(65) Prior Publication Data

US 2006/0040141 A1    Feb. 23, 2006

(30) Foreign Application Priority Data

Aug. 23, 2004    (JP) .............................. 2004-242790

(51) Int. Cl.
*B32B 5/16* (2006.01)
*G11B 5/708* (2006.01)
(52) U.S. Cl. .................. 428/329; 428/402; 428/844
(58) Field of Classification Search ............. 428/304.4, 428/402, 403, 844, 844.2, 329; 427/215
See application file for complete search history.

(56) References Cited

U.S. PATENT DOCUMENTS 4,668,379 A * 5/1987 Rosensweig et al. ....... 208/157
6,040,043 A * 3/2000 Hisano et al. .............. 428/323
6,171,692 B1 * 1/2001 Hisano et al. .............. 428/329
7,074,281 B2 * 7/2006 Matsumoto et al. ........ 148/311
7,217,400 B2 * 5/2007 Steenwinkel et al. ....... 423/138
7,238,438 B2 * 7/2007 Matsumoto et al. ..... 428/840.2
2005/0150574 A1 * 7/2005 Matsumoto et al. ........ 148/105
2006/0042417 A1 * 3/2006 Gash et al. .................. 75/415

FOREIGN PATENT DOCUMENTS

JP          9-170003        6/1997

* cited by examiner

*Primary Examiner*—H. T Le
(74) *Attorney, Agent, or Firm*—Clark & Brody

(57) ABSTRACT

A nonmagnetic powder, used for the nonmagnetic layer of a coated type magnetic recording medium having a multilayer structure, has good dispersibility in the binder in which it is dispersed to prepare a coating material that is applied to the nonmagnetic layer. The nonmagnetic powder has an iron compound as its principal component and exhibits a maximum pore volume value in a pore diameter range of 0.01 μm to 0.05 μm within a pore diameter range of 0.0018 μm to 0.1 μm in which the relationship between pore diameter and pore volume is calculated by a mercury injection method. The nonmagnetic powder exhibits a cumulative pore volume value in a pore diameter range of 0.0018 μm to 0.01 μm that is not more than 30% of the cumulative pore volume value in the pore diameter range of 0.0018 μm to 0.1 μm.

8 Claims, 1 Drawing Sheet

NONMAGNETIC POWDER COMPRISING ACICULAR IRON AND HAVING SPECIFIC POROSITY FOR A MAGNETIC RECORDING MEDIUM, METHOD OF MANUFACTURING SAME, AND MAGNETIC RECORDING MEDIUM USING SAME

BACKGROUND OF THE INVENTION

1. Field of the Invention

The present invention relates to a nonmagnetic powder for a multilayer magnetic recording medium, to a method of manufacturing the powder, and to a magnetic recording medium using the powder.

2. Description of the Prior Art

Coated type multilayer magnetic recording media are extensively utilized, having very many uses such as video tape for home use, and as such as are closely bound up with everyday life. Recently there has been a lot of research into magnetic recording media for data storage applications.

Ways of writing as much information as possible to the media include increasing the number of tape windings and increasing the density of the media themselves. The former could be achieved by reducing the thickness of the tape, while the latter could be achieved by decreasing the volume of the recording particles to thereby shrink the size the recording regions as much as possible.

With respect to achieving a higher recording density, as described in Denshi Zairyo [Electronic Materials], Vol. 35, No. 3, page 136 (Reference 1), it is necessary to carry out studies from the dual aspects of reproduction output and noise characteristics. To give a specific example, in order to improve reproduction output, it is necessary to improve the magnetizing force and decrease the recording demagnetization loss and space loss; and, to improve the noise characteristics and reduce the magnetic reversal volume, it is necessary to reduce the volume of the magnetic bodies and homogenize the particles.

The electromagnetic conversion characteristics are important for magnetic recording media. It is known that surface smoothness of the media makes a major contribution to those characteristics. With respect to decreasing the thickness of the magnetic layers, the surface properties of the nonmagnetic layer, located below the magnetic layer, has a direct effect on the surface properties of the media. JP H9-170003A (Reference 2) describes an example of previous attempts to obtain surface smoothness by specifying the shape and so forth of the particles themselves.

Concerning the smoothness of the nonmagnetic layer, through our studies, the present inventors found that while it was possible to achieve surface smoothness from the homogeneity of the particles described in Reference 1, it takes a long time to disperse the particles in the binder when preparing the nonmagnetic coating material for the lower layer.

As described above, in the case of the prior art the dispersion during the preparation of the nonmagnetic coating material takes time, so productivity is not good. In addition, if there is a lack of sufficient dispersibility, agglutination occurs during the medium coating, giving rise to surface asperities that degrade the surface smoothness of the coating. As such, improving the dispersibility improves the surface smoothness of the medium, and also helps to improve the error rate of the medium.

Therefore, an object of the present invention is to improve the surface smoothness of the medium, and to obtain nonmagnetic powder having good dispersibility in the binder, and to improve the magnetic recording medium productivity and the surface smoothness of the magnetic recording medium.

Particle shape is also important when it comes to improving the dispersibility in the binder, but it was considered that a major part is also played by the surface smoothness of the particles themselves, so the inventors carried out various studies. In these, the dehydration and baking were carried out in an ordinary atmosphere, and in the process of transforming iron oxy hydroxide to $\alpha$-ferric oxide (hematite), a rapid baked densification step was introduced, accompanied by nitrogen or steam in the atmosphere, then it was found that adding the steam after completion of temperature elevation changed the surface properties of the particles, resolving the above problems.

Pore size distribution is an index of the particle surface condition. Pore size distribution of the powder particles can be prescribed by measuring the pore size distribution. In addition to using the mercury injection method proposed by this invention for the measurement, measurement can also be done by the nitrogen adsorption method. However, in the case of the nitrogen adsorption method, the smallness of the nitrogen atoms meant that the adsorption sites were also small, so that while it was possible to obtain information on micropores, it was not possible to obtain information on macropores.

The inventors focused on particle pores, investigating the effect that adjusting the pores to various sizes had on the magnetic recording medium. This yielded the result that, with respect to a pore diameter within the range 0.0018 $\mu$m to 0.1 $\mu$m, nonmagnetic powder having excellent dispersibility could be obtained when the maximum pore volume measured (calculated) by the mercury injection method was within a pore diameter range of 0.01 $\mu$m to 0.05 $\mu$m, preferably within 0.01 $\mu$m to 0.03 $\mu$m, and more preferably within the range 0.01 $\mu$m to 0.02 $\mu$m. If the maximum value came where the upper limit of 0.05 $\mu$m was exceeded, it was considered that it increases the particle surface resistance during the dispersion of the particles in the binder, reducing particle fluidity within the coating material, thereby degrading the surface smoothness of the medium. On the other hand, if the maximum value came below the lower limit of 0.01 $\mu$m, the compatibility of the particles with the binder may be poor, reducing the dispersibility.

SUMMARY OF THE INVENTION

The present invention attains the above object by providing nonmagnetic powder for a magnetic recording medium that has an iron compound as its principal component and exhibits a maximum pore volume value on a curve of a pore diameter range of 0.01 $\mu$m to 0.05 $\mu$m plotted on a graph in which a horizontal axis is the pore diameter from 0.0018 $\mu$m to 0.1 $\mu$m and a vertical axis is the pore volume corresponding to the pore diameter, in which a relationship between pore diameter and pore volume is calculated by a mercury injection method. That is, the highest particle count is within the pore diameter range of 0.01 $\mu$m to 0.05 $\mu$m.

In the course of further various studies, it was also found that the cumulative value of the pore volume had a major effect on the dispersibility. Specifically, with respect to a desirable pore distribution for the nonmagnetic powder, when particle pore diameter is represented by the horizontal axis and the cumulative value of the pore volume by the vertical axis, the above object is also attained by a nonmagnetic powder which exhibits a cumulative pore volume value in a pore diameter range of 0.0018 $\mu$m to 0.01 $\mu$m that is not more than 30%, preferably not more than 20%, and more preferably is not more than 10% of the cumulative pore volume value in the pore diameter range of 0.0018 μm to 0.1 μm.

If the proportion of the cumulative pore volume in the pore diameter range of 0.0018 μm to 0.01 μm is larger than 30%, there will be too many small pores, which will have a large impact on the particle dispersibility and is therefore undesirable with respect to maintaining the surface smoothness of the medium. Based on this knowledge, studies were conducted with respect to the method of manufacturing nonmagnetic powder having the above cumulative pore volume values and pore maximum frequency values. These studies showed that it was possible to obtain nonmagnetic powder having the above particle characteristics by using the method described below.

In addition, nonmagnetic powder that is provided with a phosphorus (P) content exhibits a sintering prevention effect, and effects a change in the particle pH to a weakly acidic state that is desirable from the standpoint of particle dispersion. The desirable phosphorus content is 0.1 to 5 percent by weight (wt %), preferably 0.2 to 3.0 wt %, and more preferably 0.5 to 2.0 wt %. If there is less than 0.1 wt % phosphorus, it will be unable exhibit a sufficient sintering prevention effect, resulting in the sintering of the subsequent hematite. If the phosphorus content exceeds 5 wt %, the particles will become more acidic than necessary, adversely affecting metallic magnetic powder of the upper layer.

Silicon (Si) and/or aluminum (Al) can be added in order to maintain the shape of the inventive particles. While it is desirable to add these elements, it was found that increasing the addition amount does not produce a corresponding increase in the effect. It is preferable for one or both elements to be added in a total amount that is within the range 0.1 to 10 wt %. Both the Al and the Si can be added by being adhered to the surface of the particles or as internal content. A content that is less than 0.1 wt % is undesirable, since in that case almost no effect is observable. Similarly, it is also undesirable for the content to exceed 10 wt %, since the extra Al and Si tends to degrade the dispersibility in the particle vehicle.

One of the effects of adding these elements is that of improved particle hardness. The elements may therefore be added when the powder particles of this invention are required to have a certain hardness for other applications, such as when they are added as filler in the magnetic recording media. When the particles are thus to be used for such applications that require a certain degree of hardness, the addition amount of hardening elements should be adjusted to modify the hardness.

Rare earth elements including yttrium (Y) may also be added. The particle shape maintenance effect can be improved by adding those elements. It is preferable to add these elements by adhering them to the particles. Y and other rare earth elements should be added in an amount in the range 0.1 to 10 wt %, preferably 0.1 to 5.0 wt %, and more preferably 0.1 to 2.5 wt %. Rare earth elements including Y will not have the required effect if the content is less than 0.1 wt %, and therefore the shape maintenance will not be sufficient, in addition to which it will weaken the strength of the coating layer. On the other hand, if the content exceeds 10 wt %, after application the iron oxy hydroxide will agglutinate, so that baking will actually produce sintering, adversely affecting the surface smoothness of the medium.

The nonmagnetic powder of the invention can be manufactured by introducing steam into the baking atmosphere to obtain α-ferric oxide from the iron oxy hydroxide. It is also desirable to elevate the temperature at a rate of at least 50° C./min until the temperature is achieved at which the iron oxy hydroxide is baked to obtain α-ferric oxide. Densification in baking will be insufficient if the temperature elevation rate is slower than 50° C./min, which will have an effect during particle dispersion, resulting in a distribution in which the surface smoothness of particles is affected by holes. That is, desorption of moisture in the system becomes irregular, resulting in a pore distribution that adversely affects the dispersibility.

Further features of the invention, its nature and various advantages will be more apparent from the accompanying drawings and following detailed description of the invention.

DESCRIPTION OF THE PREFERRED EMBODIMENT

Figure 1:
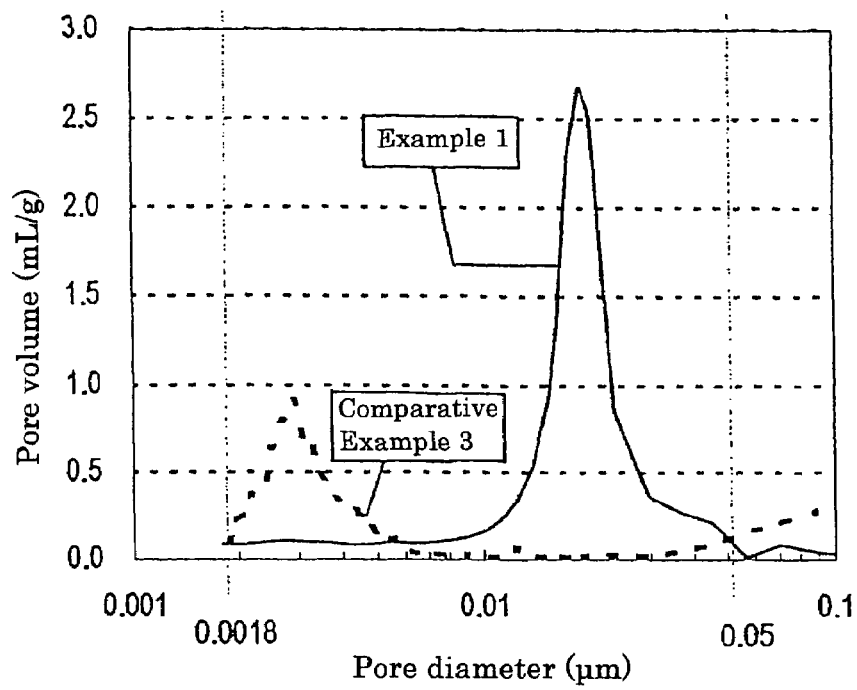
FIG. 1 is a graph showing the correlation between pore diameter and pore volume of the nonmagnetic powder of Example 1, together with that of Comparative Example 3.

In accordance with this invention, the productivity with which a nonmagnetic coating material having excellent dispersibility is prepared is improved, and it is possible to efficiently obtain nonmagnetic powder for a magnetic recording medium having excellent surface smoothness.

Acicular iron oxide or iron oxy hydroxide has been proposed as the nonmagnetic powder used for forming the nonmagnetic layer of a multilayer magnetic recording medium, but these proposals say nothing about how the shape of the powder particle pores affect the characteristics of the nonmagnetic layer and the magnetic layer characteristics. In this invention, when iron oxy hydroxide is being baked by being heated to manufacture acicular iron oxide, the baking conditions are adjusted to control the pores of the iron oxide powder particles obtained, to improve the productivity of the recording medium manufacturing process and to help improve the surface smoothness of the medium.

That is, it applies to nonmagnetic powder for a magnetic recording medium that has an acicular iron compound as its principal component and exhibits a maximum pore volume value in a pore diameter range of from 0.01 μm to 0.05 μm within a pore diameter range of 0.0018 μm to 0.1 μm calculated by the mercury injection method. Moreover, taking the cumulative pore volume within the range 0.0018 μm to 0.1 μm as 100%, it applies to nonmagnetic powder for a magnetic recording medium that has an acicular iron compound as its principal component and exhibits a cumulative pore volume value in the pore diameter range of 0.0018 μm to 0.01 μm that is not more than 30%.

With the horizontal axis representing pore diameter calculated by the mercury injection method and the vertical axis the cumulative pore volume value, taking the cumulative pore volume value of the nonmagnetic particles in the pore diameter measurement range of 0.0018 μm to 0.1 μm as 100%, the cumulative pore volume value in the pore diameter range of 0.0018 μm to 0.01 μm should be not more than 30%, preferably not more than 20%, and more preferably not more than 10%. If the proportion of the cumulative pore volume in the pore diameter range of 0.0018 μm to 0.01 μm is larger than 30%, there will be too many small pores, which will have a large impact on the particle dispersibility and is therefore undesirable with respect to maintaining the surface smoothness of the medium.

Particles having such a pore distribution that have as their main component acicular iron oxide can be obtained by appropriately controlling the baking conditions when iron oxy hydroxide is being baked to change it to hematite. There is no particular limitation on the conditions used to fabricate the iron oxy hydroxide that is used; iron oxy hydroxide obtained by a conventional method may be used. Examples of methods that can be used to obtain the iron oxy hydroxide include a method in which an alkali hydroxide is added to a ferrous salt and an oxidizing gas passed therethrough, and a method in which an alkali carbonate is added to a ferrous salt to form ferrous carbonate through which an oxygen-containing gas is then passed.

In the process of producing acicular $\alpha$-ferric oxide using acicular iron oxy hydroxide as the starting material, in accordance with this invention, the material is heated in an inert gas atmosphere and maintained in that state until the temperature stabilizes, after which the atmosphere is switched to air and, depending on the conditions in the oven, steam is introduced. The heating of the iron oxy hydroxide releases large quantities of steam with the dehydration into the system. When there is more heat than necessary, particles of less-dispersible $\alpha$-ferric oxide are deposited, adversely affecting the final medium characteristics. Therefore, at the heating stage it is undesirable to intentionally add steam, but steam has to be added intermittently in order to maintain a constant concentration of steam in the system.

It was found that performing these operations makes it possible to control the shape of the pores, enabling a maximum pore volume value to be controlled to be present in a pore diameter range of from 0.01 µm to 0.05 µm within a pore diameter range of 0.0018 µm to 0.1 µm, and enabling the proportion of the pore volume value in the pore diameter range of 0.0018 µm to 0.01 µm to be controlled to be not more than 30% of the pore volume in the range of 0.0018 µm to 0.1 µm. Specifically, when heating to the baking temperature in an inert atmosphere (a nitrogen atmosphere, for example), the temperature is elevated at a rate of not less than 50° C./min, preferably at a rate of not less than 55° C./min, and more preferably at a rate of not less than 60° C./min. It is also preferable for steam to be present during the baking. Steam should be introduced in an amount that is 0.01 to 50 percent by volume (vol %) of the nitrogen amount.

It is considered that the atmosphere, temperature elevation rate and steam used during the transition of the iron oxy hydroxide to $\alpha$-ferric oxide can have a composite effect on the baked densification state of the particles. With respect to atmosphere, when the baking is not carried out at a high temperature in air, it is more likely to produce magnetite than hematite, preventing the proper nonmagnetic powder being obtained. When the temperature elevation rate is slower than the above rates, the baked densification will not be enough, which will have an effect, during the dispersion of the particles, that the pores on the particle surface will have such distribution that it will give rise to particle surface asperities. Introducing steam into the atmosphere during the baking process may change the surface quality of the particles, providing a pore distribution with few surface asperities.

With the hematite thus obtained, the horizontal axis representing pore diameter calculated by the mercury injection method and the vertical axis representing the cumulative pore volume value, taking the cumulative pore volume value within the pore diameter measurement range of 0.0018 µm to 0.1 µm as 100%, the cumulative pore volume value in the pore diameter range of 0.0018 µm to 0.01 µm should be not more than 30%, preferably not more than 20%, and more preferably not more than 10%. In addition, when the maximum pore volume value (the highest pore size concentration) is within 0.01 µm to 0.05 µm in the pore diameter range of 0.0018 µm to 0.1 µm, the nonmagnetic powder is able to form a nonmagnetic layer having very good properties for a magnetic recording medium with a multilayer structure.

In accordance with the above method, it is possible to obtain hematite having an optimal pore diameter distribution with respect to dispersibility during coating formation. In addition, it is also preferable that the particles having an acicular iron compound as the principal component, in accordance with this invention, have the following properties.

Length of major axis: 10 to 150 nm;
Specific surface area as measured by the BET method: 20 to 100 $m^2$/g;
Specific surface area as measured by the mercury injection method: 40 to 150 $m^2$/g;
Phosphorus (P) content: 0.1 to 5 wt %;
Water-soluble phosphorus compound: P equivalent of not more than 100 ppm;
Water-soluble sodium (Na) salt: Na equivalent of not more than 100 ppm;
Water-soluble sulfate: $SO_4$ equivalent of not more than 100 ppm;
Powder pH: Not more than 9, preferably not more than 8, more preferably not more than 7;
Rare earth elements (including yttrium): 0.1 to 10 wt %;
At least one of Al and Si: 0.1 to 10 wt % as total.
The particles can also be provided with the following.
Stearic acid adsorption amount: 0.1 to 3.0 mg/$m^2$, preferably 0.1 to 2.0 mg/$m^2$, more preferably 0.1 to 1.5 mg/$m^2$. The lower the stearic acid adsorption amount, the lower the adsorption of fatty acid constituting the lubricant when dispersing the powder in the coating material. That means that a lower stearic acid adsorption amount makes it more difficult to have an adverse effect on the lubrication effect.

Polyurethane resin adsorption amount (UR): 0.1 to 4.0 mg/$m^2$, preferably 0.5 to 3.0 mg/$m^2$, more preferably 1.0 to 3.0 mg/$m^2$. The higher the polyurethane resin adsorption amount (UR), the better the resin adhesiveness becomes, also increasing the strength of the coating layer.

Polyvinyl chloride adsorption amount (MR): 0.1 to 4.0 mg/$m^2$, preferably 1.0 to 4.0 mg/$m^2$, more preferably 2.0 to 4.0 mg/$m^2$. For the same reason as in the case of UR, a higher polyvinyl chloride adsorption amount is desirable, since it improves the strength of the coating layer.

With respect to the shape, the particles can be acicular, spindle shaped, flat-acicular shaped, cylindrical, ellipsoidal, and so forth.

The nonmagnetic powder of this invention is used for a magnetic recording medium having a coating type multilayer structure. In this case, there is a nonmagnetic layer comprised of this nonmagnetic powder on a base film, and on top of that, a magnetic layer comprised of magnetic powder. When these layers are formed, the nonmagnetic coating material and magnetic coating material are coated on the base film, after which calendering is used to smooth the surface. Surface roughness is used as an index of the surface smoothness. In a case in which the nonmagnetic powder of this invention is used, the surface roughness prior to calendering should be not more than 200 angstrom (Å), and preferably not more than 150 angstrom (Å).

Calendering can change the thickness by more than 50%. Therefore, the surface roughness after calendering can be 100 angstrom (Å) or less, and preferably is 75 angstrom (Å) or less. The larger the percentage change in thickness resulting from the calendering, the better the moldability of the nonmagnetic layer is. As such, a large change in thickness resulting from the calendering translates into an improvement in the surface smoothness of the tape. The calendering-based change in thickness should be at least 50%, preferably at least 60%, and more preferably at least 70%.

The tape running durability of the tape used as a magnetic recording medium can be quantitatively expressed in terms of the number of steel-ball slide passes. In the case of tape using the nonmagnetic powder of this invention, as described in the examples below, the tape can be resist over 600 steel-ball sliding passes, preferably over 900 passes, and more preferably over 1500 passes. The higher the tape running durability is, the smaller the width of the damage marks the steel-ball passes inflict on the tape. In the case of the tape using the nonmagnetic powder of this invention, the width of the marks can be 190 μm or less, preferably 170 μm or less, and more preferably 150 μm or less.

When forming a nonmagnetic layer of the iron oxide powder of this invention in a magnetic recording medium having a multilayer structure, the magnetic powder used in the magnetic layer formed thereon, the coating constituents and the base film can be exemplified as follows.

In terms of atomic percent (at%) with respect to Fe, the ferromagnetic powder particles constituting the magnetic layer are comprised of Co: 5 to 50 at %; Al: 0.1 to 50 at %; rare earth elements (including Y): 0.1 to 30 at %; periodic table group 1a elements (Li, Na, K, etc.): not more than 0.05 wt. %; periodic table group 2a elements (Mg, Ca, Sr, Ba, etc.): not more than 0.3 wt. %; with most of the remainder being iron, that meet the conditions of having an average major axis diameter 10 to 200 nm; a specific surface area measured by the BET method of 30 to 150 m$^2$/g; and an x-ray crystalline size ($D_x$) of 50 to 200 angstrom (Å), and with respect to bulk magnetic characteristics, having a coercive force (Hc) of 79.6 to 238.9 kA/m (1000 to 3000 (Oe)) and a magnetic saturation amount (σs) of 10 to 200 A·m$^2$/kg, and which have a shape as described above.

The base film used to form the multilayer magnetic recording medium may be a polyester such as polyethylene phthalate or polyethylene 2-6-naphthalate, a polyolefin such as polypropylene, a cellulose derivative such as cellulose triacetate or cellulose diacetate, or a polyamide, a polycarbonate or other plastic.

An example of the components of the magnetic coating material that forms the magnetic layer is: 100 parts by weight of the metallic magnetic powder (characteristic values: Co/Fe=24 (at % ratio); coercive force Hc=187.5 kA/m; average major axis of 45 nm; crystallite size $D_{110}$=140 angstrom (Å); σs=120 A·m$^2$/kg; Δσs=6%); 5 parts by weight carbon black; 3 parts by weight alumina; 15 parts by weight polyvinyl chloride resin (MR 110 manufactured by Zeon Corporation); 15 parts by weight polyurethane resin (UR 8200 Polyurethane Resin manufactured by Toyobo Co., Ltd.); 1 part by weight stearic acid; 1 part by weight acetyl acetone; 190 parts by weight methyl ethyl ketone; 80 parts by weight cyclohexanon; and 110 parts by weight toluene.

An example of the components of the nonmagnetic coating material that forms the nonmagnetic layer is: 85 parts by weight of the nonmagnetic powder of this invention, 20 parts by weight carbon black, 3 parts by weight alumina, 15 parts by weight polyvinyl chloride resin (MR 110), 15 parts by weight polyurethane resin (UR 8200), 190 parts by weight methyl ethyl ketone, 80 parts by weight cyclohexanon, and 110 parts by weight toluene.

When preparing the coating material for a magnetic layer or for a nonmagnetic layer, the components are kneaded and dispersed using a kneader and a sand-grinder. The coating material can then be applied to the base film using either the wet-on-wet or the dry-on-wet process.

Before proceeding to the Examples described below, the methods of obtaining the various measurement values described in the Examples will be explained.

Length of major axis, length of minor axis, aspect ratio

The major axis, minor axis, and aspect ratio (major axis/minor axis) are average values obtained from measuring 500 random particles in transmission electron microphotographs that are 174000-times magnifications. However, only isolated particles were measured; particles that overlapped, obscuring particle boundaries, were excluded from the measurement. The longest length measured in the longitudinal direction of a particle was used as the major axis, and the longest length measured across the width of a particle was used as the minor axis.

Specific surface area

1. Calculation of pore distribution and specific surface area by the mercury injection method An Autopore III 9420 manufactured by Micromeritrics Instrument Co. was used to measure the pore distribution in the pore diameter range of 0.0018 μm to 0.1 μm. The correlation between cumulative pore volume and pore diameter was calculated using a graph in which the vertical axis showed the cumulative pore volume and the horizontal axis showed the pore diameter. The measurements made with the measuring instrument was used to calculate particle pore diameter and mercury-equivalent surface areas.

2. Calculation of specific surface area by the BET method

Using the 4 Sorb US manufactured by Yuasa Ionics Inc., the specific surface area was calculated by the BET method.

Powder pH

A method conforming to the hot extraction method of JIS K 5101 was implemented. This involved adding a 5 g sample to 100 mL of pure water in a hard glass Erlenmeyer flask, heating it for five minutes to bring it to the boil, and boiling it for a further five minutes. At this time, pure water from which carbon dioxide had been removed beforehand by boiling is added in an amount equal to the amount by which the solution has decreased, and the value is adjusted accurately. Then, the flask is cooled to room temperature in a cooling column, and the pH of the aqueous suspension is measured in accordance with the method of JIS Z 8802.

Tape fabrication and characteristics

Fabrication of lower layer tape for magnetic recording medium: 100 parts by weight of the sample iron oxide powder, 10 parts by weight polyvinyl chloride based resin (MR 110), 10 parts by weight polyurethane resin (UR 8200), 165 parts by weight methyl ethyl ketone, 65 parts by weight cyclohexanon, 165 parts by weight toluene, 1 part by weight stearic acid, and 1 part by weight acetyl acetone were blended together and dispersed for one hour using a centrifugal ball mill to obtain a coating material, and the coating material was applied with an applicator to a base film composed of polyethylene phthalate to obtain a coating layer about 3 μm thick, to thereby obtain the tape for the non-magnetic lower layer.

Viscosity of coating material: The R 110 viscometer manufactured by Toki Sangyo Co., Ltd. was used to measure the viscosity of the coating material.

Surface smoothness (surface roughness): The surface roughness (Ra) of the tape was measured using a three-dimensional fine shape measuring machine (model ET-30HK) manufactured by Kosaka Laboratory Ltd.

Surface smoothness (glossiness): The smoothness of the lower layer tape was measured at an angle of 60 degrees, using a glossmeter.

Coating strength (steel-ball sliding): The tape was adhered to a glass plate with the coated side of the tape facing upwards. The glass plate was then laid flat, a stainless-steel ball 5 mm in diameter placed on the coated surface of the tape, and a vertical load of 5 g placed on the ball. In this state, the glass plate is moved horizontally back and forth, 20 mm in each direction, at a fixed speed of 2320 mm/min, and this reciprocal motion is repeated for 300 passes. An optical microscope is then used to view and measure the width of the damage marks left on the tape surface by the steel ball. The sliding passes are further repeated to measure the number of passes it takes before the coating peels and falls off.

Tape running durability (steel-ball sliding): The number of sliding passes the steel ball makes before the coating layer peels and falls off was measured.

Electromagnetic conversion characteristics: These were measured by attaching a recording head to a drum tester and recording digital signals with a recording wavelength of 0.35 μm. An MR recording head was used, the reproduction signal was measured and is shown as a value relative to the output value of 0 dB of Comparative Example 2 described below.

Head dirt: Following the above steel-ball sliding operation, dirt sticking to the stainless-steel ball is visually examined and evaluated using a four-level ranking. A ⊙ symbol indicates almost no dirt, ○ indicates some dirt, but not enough to be a problem, Δ indicates enough dirt to cause a problem, and x indicates a very bad level of dirt.

Evaluation of surface condition: After being calendered, FE-SEM is used to examine the tapes at a 100000-times magnification, to compare the state of asperities in the field of view. A three-level ranking is used for the evaluation, with the ○ symbol indicating almost no projections (less than 1% of the total field of view), Δ indicating some projections (not more than 5% of the total field of view), and x indicating projections that exceed 5% of the total field of view, enough to the head running performance.

Particle dispersibility evaluation: 100 parts by weight of the sample iron oxide powder, 10 parts by weight polyvinyl chloride based resin (MR 110), 10 parts by weight polyurethane resin (UR 8200), 165 parts by weight methyl ethyl ketone, 65 parts by weight cyclohexanon, 165 parts by weight toluene, 1 part by weight stearic acid, and 1 part by weight acetyl acetone were blended together and dispersed for one hour using a centrifugal ball mill to obtain a coating material. The Freeze Replica (FR) method was used, in which the coating material was then dripped through a TEM-sample mesh and frozen using liquid nitrogen, which was followed by carbon vapor deposition, replica extraction, and TEM observation to observe the state of dispersion in the solvent and evaluate the state of agglutination. This FR evaluation was done using a three-level ranking in which a ○ mark indicates very good particle dispersibility, a Δ mark indicates quite good dispersibility, with no more than 5% agglutination in the field of view, and an x mark indicates poor dispersibility, with agglutination in the field of view exceeding 5%. Imaging was used to extract different locations to try and minimize field-of-view based bias.

EXAMPLES

An embodiment of the present invention will now be described with reference to the following examples, which are not limitative with respect to the technical scope of the invention.

Example 1

To 4 liters of a slurry of iron oxy hydroxide (major axis of 132 nm, specific surface area measured by the BET method of 87.0 $m^2/g$) having a particle concentration of 20 g/L, produced via iron carbonate, was added 8 liters of orthophosphoric acid adjusted to 0.02 wt %, for phosphorus adhesion. After washing, drying was carried out at 300° C. until the water content was 0.5 wt % in the measured values derived from the Karl Fischer method, thereby obtaining particles having a main component comprised of a phosphorus-covered iron compound.

Figure 2:
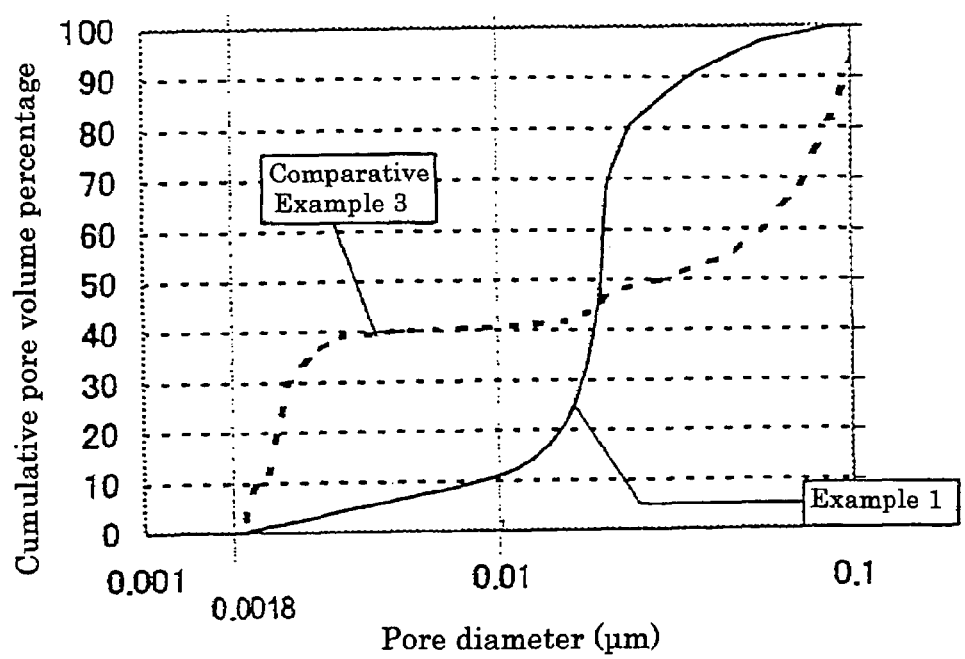
FIG. 2 is a graph showing the correlation between pore diameter and cumulative pore volume percentage of the nonmagnetic powder of Example 1, together with that of Comparative Example 3.

Next, these particles were placed in a bucket through which air could flow, which was then placed in a perforated type baking oven, where the temperature was elevated to 590° C. at 60° C./min in nitrogen gas, at which point, with the nitrogen still flowing, steam was added and adjusted to a concentration of 5 vol % of the gas total, and the particles were maintained at that temperature for 20 minutes. Next, while continuing to add steam at the same concentration, the nitrogen was switched to air and baking proceeded for a further 20 minutes at 590° C. in the same oven, which was followed by cooling to room temperature to obtain α-ferric oxide (hematite). Table 1 shows the properties of the particles thus obtained, and the characteristics of tapes using the particles. The correlation between the pore diameter and pore volume of the particles obtained in this example, is shown in FIG. 1, and is shown in FIG. 2 the correlation between pore diameter and cumulative pore percentage.

Example 2

2.04 g of aluminum oxide was dissolved in 100 ml of dilute sulfuric acid and the solution (with the Al corresponding to 1.35 wt %) was added to the same iron oxy hydroxide slurry used in Example 1, which was then heated to 50° C., maintained at that temperature for 20 minutes, then filtered, washed, dried (at 130° C.), to obtain particles composed mainly of an Al-covered iron oxide.

The particles thus obtained were again dispersed in pure water, forming 4 liters of slurry having a particle concentration of 20 g/L. To this was added 8 liters of orthophosphoric acid adjusted to 0.02 wt %, for phosphorus adhesion. After washing, drying was carried out at 300° C. until the water content was 0.5 wt % in the measured values derived from the Karl Fischer method, thereby obtaining particles having a main component comprised of an Al/phosphorus covered iron compound.

The particles were then placed in a bucket through which air could flow, which was then placed in a perforated type baking oven, where the temperature was elevated to 590° C. at 60° C./min in nitrogen gas, at which point, with the nitrogen still flowing, steam was added and adjusted to a concentration of 5 vol % of the gas total, and the particles were maintained at that temperature for 20 minutes. Then, while continuing to add steam at the same concentration, the nitrogen was switched to air and baking proceeded for a further 20 minutes at 590° C. in the same oven, which was followed by cooling to room temperature to obtain α-ferric oxide (hematite). Table 1 shows the properties of the particles thus obtained, and the characteristics of tapes using the particles.

Example 3

The same iron oxy hydroxide slurry as in Example 1 was used, to which was added 8.581 g (corresponding to 1.83 wt % Si) of a solution containing 36.5 wt % of primary sodium silicate as $SiO_2$ in the water, the mixture was heated to 60° C., then 1% acetic acid was added to make it mildly acidic. It was then maintained at that temperature for 20 minutes, filtered, washed and dried (at 130° C.) to obtain powder composed mainly of a silicon-covered iron compound.

The powder particles thus obtained were again dispersed in pure water, forming 4 liters of slurry having a particle concentration of 20 g/L. To this was added 8 liters of orthophosphoric acid adjusted to 0.02 wt %, for phosphorus adhesion. After washing, drying was carried out at 300° C. until the water content was 0.5 wt % in the measured values derived from the Karl Fischer method, thereby obtaining particles having a main component comprised of a silicon/phosphorus-covered iron compound.

The particles were then placed in a bucket through which air could flow, which was then placed in a perforated type baking oven, where the temperature was elevated to 590° C. at 60° C./min in nitrogen gas, at which point, with the nitrogen still flowing, steam was added and adjusted to a concentration of 5 vol % of the gas total, and the particles were maintained at that temperature for 20 minutes. Then, while continuing to add steam at the same concentration, the nitrogen was switched to air and baking proceeded for a further 20 minutes at 590° C. in the same oven, which was followed by cooling to room temperature to obtain α-ferric oxide (hematite). Table 1 shows the properties of the particles thus obtained, and the characteristics of tapes using the particles.

Example 4

The same iron oxy hydroxide slurry as in Example 1 was used, to which was added 8.581 g (corresponding to 1.83 wt % Si) of a solution containing 36.5 wt % of primary sodium silicate as $SiO_2$ in the water, the mixture was heated to 60° C., and 1% acetic acid was added to make it mildly acidic. It was then maintained at that temperature for 20 minutes, filtered, washed and dried (at 130° C.) to thereby obtain silicon-covered iron oxy hydroxide. The iron oxy hydroxide was again dispersed in pure water, forming 4 liters of slurry having a particle concentration of 20 g/L. To this was added 2.04 g of aluminum oxide dissolved in 100 ml of dilute sulfuric acid and the solution (with the Al corresponding to 1.35 wt %) was then heated to 50° C. After then adding sodium hydroxide and adjusting the pH to 8.5, the preparation was maintained at that temperature for 20 minutes, then filtered, washed, dried (at 130° C.), to obtain particles composed mainly of a silicon- and Al-covered iron compound.

The particles thus obtained were again dispersed in pure water, forming 4 liters of slurry having a particle concentration of 20 g/L. To this was added 8 liters of orthophosphoric acid adjusted to 0.02 wt %, for phosphorus adhesion. After washing, drying was carried out at 300° C. until the water content was 0.5 wt % in the measured values derived from the Karl Fischer method, thereby obtaining particles having a main component comprised of a Si/Al/P-covered iron compound.

The particles were then placed in a bucket through which air could flow, which was then placed in a perforated type baking oven, where the temperature was elevated to 590° C. at 60° C./min in nitrogen gas, at which point, with the nitrogen still flowing, steam was added and adjusted to a concentration of 5 vol % of the gas total, and the particles were maintained at that temperature for 20 minutes. Then, while continuing to add steam at the same concentration, the nitrogen was switched to air and baking proceeded for a further 20 minutes at 590° C. in the same oven, which was followed by cooling to room temperature to obtain α-ferric oxide (hematite). Table 1 shows the properties of the particles thus obtained, and the characteristics of tapes using the particles.

Example 5

Example 1 was repeated, except that the particles placed in the bucket, having an iron compound as their main component were heated at a rate of 50° C./min in nitrogen gas. Table 1 shows the properties of the α-ferric oxide (hematite) thus obtained, and the characteristics of tapes using it.

Example 6

Example 1 was repeated, except that the particles placed in the bucket, having an iron compound as their main component were heated at a rate of 80° C./min in nitrogen gas. Table 1 shows the properties of the α-ferric oxide (hematite) thus obtained, and the characteristics of tapes using it.

Example 7

Example 1 was repeated, except that 1.02 wt % Y was added by adhesion to the iron oxy hydroxide produced via iron carbonate, and 8 liters of orthophosphoric acid adjusted to 0.01 wt % was added to 4 liters of the slurry having a particle concentration of 20 g/L for phosphorus adhesion. Table 1 shows the properties of the α-ferric oxide (hematite) thus obtained, and the characteristics of tapes using it.

Example 8

Example 1 was repeated, except that 0.73 wt % Y was added by adhesion to the iron oxy hydroxide produced via iron carbonate. Table 1 shows the properties of the α-ferric oxide (hematite) thus obtained, and the characteristics of tapes using it.

Example 9

Example 3 was repeated, except that 1.02 wt % Y was added by adhesion to the iron oxy hydroxide produced via iron carbonate, and 9.284 g (corresponding to 1.98 wt % Si) of a solution containing 36.5 wt % of primary sodium silicate as $SiO_2$ in the water was added to 4 liters of the slurry having a particle concentration of 20 g/L to effect the same adhesion treatment as Example 3, but treatment using phosphoric acid was not performed. Thus, other than that operation, Example 3 was repeated, thereby obtaining particles having an iron compound as their main component. Table 1 shows the properties of the α-ferric oxide (hematite) thus obtained, and the characteristics of tapes using it.

Comparative Example 1

Example 1 was repeated, without the phosphorus adhesion. The hematite thus obtained was sintered, markedly decreasing the dispersibility.

Comparative Example 2

Example 1 was repeated, except that in the oxidization of the particles having an iron compound as their main component, the temperature elevation was carried out in a nitrogen atmosphere, a nitrogen atmosphere was also used thereafter, and steam was not added. Table 1 shows the properties obtained when the particles were used, and the characteristics of tapes using it.

Comparative Example 3

Example 1 was repeated, except that in the oxidation of the particles having an iron compound as their main component, the temperature elevation was carried out in a nitrogen atmosphere. Table 1 shows the properties obtained when the particles were used, and the characteristics of tapes using it. However, the adding of the steam was done using the same timing as Example 1. That is, the process time, temperature and other such conditions were the same as in Example 1. In FIG. 1, the correlation between the pore diameter and pore volume of the particles obtained by this Comparative Example 3 is shown, alongside FIG. 2 shows the correlation between pore diameter and cumulative pore percentage by this Comparative Example 3.

Comparative Example 4

This was a repetition of Example 1, except that steam was not introduced when oxidizing the particles. Table 1 shows the properties obtained when the particles were used, and the characteristics of tapes using it.

Comparative Example 5

Example 1 was repeated, except that in the nitrogen gas, the temperature was elevated at 10° C./min. Table 1 shows the properties of the α-ferric oxide (hematite) thus obtained, and the characteristics of tapes using it.

Comparative Example 6

This was a repetition of Example 2, using the same iron oxy hydroxide slurry as Example 2, except that there was no phosphoric acid treatment after the aluminum adhesion process. Table 1 shows the properties of the α-ferric oxide (hematite) thus obtained, and the characteristics of tapes using it.

Comparative Example 7

This was a repetition of Example 3, using the same iron oxy hydroxide slurry as Example 3, except that there was no phosphoric acid treatment after the silicon adhesion process. Table 1 shows the properties of the α-ferric oxide (hematite) thus obtained, and the characteristics of tapes using it.

Comparative Example 8

Example 1 was repeated, using the same iron oxy hydroxide as Example 1, except that phosphorus adhesion was effected by adding 300 mL of orthophosphoric acid adjusted to 0.02 wt %. Table 1 shows the properties of the α-ferric oxide (hematite) thus obtained, and the characteristics of tapes using it.

Comparative Example 9

Example 1 was repeated, except that in the nitrogen gas, the temperature of the particles was elevated at 40° C./min. Table 1 shows the properties of the α-ferric oxide (hematite) thus obtained, and the characteristics of tapes using it.

TABLE 1

| | Temperature Elevation | | Held | | Iron Oxy Hydroxide | | | | α-Ferric Oxide Characteristics | | | |
| | Rate | Atmosphere | Atmosphere | Steam | P (wt %) | Al (wt %) | Si (wt %) | Y (wt %) | P (wt %) | Al (wt %) | Si (wt %) | Y (wt %) |
|---|---|---|---|---|---|---|---|---|---|---|---|---|
| Example 1 | 60° C./min | Nitrogen | Air | Yes | 1.45 | — | — | — | 1.03 | — | — | — |
| Example 2 | 60° C./min | Nitrogen | Air | Yes | 1.32 | 1.27 | — | — | 0.98 | 1.21 | — | — |
| Example 3 | 60° C./min | Nitrogen | Air | Yes | 1.42 | — | 1.74 | — | 1.01 | — | 1.41 | — |
| Example 4 | 60° C./min | Nitrogen | Air | Yes | 1.35 | 1.25 | 1.68 | — | 0.99 | 1.19 | 1.35 | — |
| Example 5 | 50° C./min | Nitrogen | Air | Yes | 1.42 | — | — | — | 1.04 | — | — | — |
| Example 6 | 80° C./min | Nitrogen | Air | Yes | 1.43 | — | — | — | 1.07 | — | — | — |
| Example 7 | 60° C./min | Nitrogen | Air | Yes | 0.71 | — | — | 1.03 | 0.64 | — | — | 0.89 |
| Example 8 | 60° C./min | Nitrogen | Air | Yes | 1.32 | — | — | 0.51 | 1.02 | — | — | 0.41 |
| Example 9 | 60° C./min | Nitrogen | Air | Yes | — | — | 1.82 | 1.02 | — | — | 1.78 | 0.89 |
| Comparative Example 1 | 60° C./min | Nitrogen | Air | Yes | — | — | — | — | — | — | — | — |
| Comparative Example 2 | 60° C./min | Nitrogen | Nitrogen | No | 1.57 | — | — | — | 1.19 | — | — | — |
| Comparative Example 3 | 60° C./min | Nitrogen | Nitrogen | Yes | 1.42 | — | — | — | 1.03 | — | — | — |
| Comparative Example 4 | 60° C./min | Nitrogen | Air | No | 1.38 | — | — | — | 1.02 | — | — | — |
| Comparative | 10° C./min | Nitrogen | Air | Yes | 1.39 | — | — | — | 0.97 | — | — | — |

TABLE 1-continued

|  |  |  |  |  |  |  |  |  |  |  |
|---|---|---|---|---|---|---|---|---|---|---|
| Example 5 |  |  |  |  |  |  |  |  |  |  |
| Comparative Example 6 | 60° C./min | Nitrogen | Air | Yes | — | 1.32 | — | — | 1.25 | — | — |
| Comparative Example 7 | 60° C./min | Nitrogen | Air | Yes | — | 1.72 | — | — | — | 1.62 | — |
| Comparative Example 8 | 60° C./min | Nitrogen | Air | Yes | 0.05 | — | — | — | 0.03 | — | — |
| Comparative Example 9 | 40° C./min | Nitrogen | Air | Yes | 1.43 | — | — | — | 1.04 | — | — |

|  |  |  |  |  | Mercury Injection Method | | |
|---|---|---|---|---|---|---|---|---|
|  | Major Axis nm | Aspect Ratio | BET m²/g | Powder pH | Specific Surface Area m²/g | 0.01~0.1 μm pores as percent of total (%) | 0.0018~0.01 μm pores as percent of total (%) | Pore diameter indicating max. pore volume (μm) |
| Example 1 | 100 | 7.5 | 75.0 | 6.3 | 95.0 | 88.7 | 11.3 | 0.0190 |
| Example 2 | 95 | 7.8 | 62.2 | 7.3 | 77.9 | 87.5 | 12.5 | 0.0170 |
| Example 3 | 97 | 7.4 | 58.9 | 6.8 | 67.8 | 83.7 | 16.3 | 0.0190 |
| Example 4 | 103 | 6.8 | 53.7 | 7.2 | 68.6 | 80.3 | 19.7 | 0.0200 |
| Example 5 | 101 | 6.8 | 73.2 | 6.3 | 83.7 | 86.7 | 13.3 | 0.0312 |
| Example 6 | 99 | 7.3 | 70.3 | 6.4 | 78.3 | 87.9 | 12.1 | 0.0413 |
| Example 7 | 109 | 7.3 | 56.4 | 7.4 | 64.8 | 84.9 | 15.1 | 0.0425 |
| Example 8 | 103 | 6.8 | 52.8 | 7.2 | 62.9 | 81.8 | 18.2 | 0.0200 |
| Example 9 | 98 | 6.7 | 62.3 | 8.6 | 74.7 | 72.3 | 27.7 | 0.0492 |
| Comparative Example 1 | 78 | 6.7 | 36.8 | 8.9 | 42.3 | 42.9 | 57.1 | 0.1300 |
| Comparative Example 2 | 104 | 7.9 | 83.0 | 6.8 | 103.0 | 59.3 | 40.7 | 0.0029 |
| Comparative Example 3 | 109 | 6.2 | 92.3 | 8.7 | 115.5 | 65.4 | 34.6 | 0.0053 |
| Comparative Example 4 | 101 | 6.7 | 95.2 | 7.9 | 109.3 | 62.3 | 37.7 | 0.0042 |
| Comparative Example 5 | 108 | 6.9 | 83.9 | 8.0 | 96.7 | 96.5 | 3.5 | 0.0743 |
| Comparative Example 6 | 107 | 6.8 | 64.9 | 8.3 | 74.8 | 92.3 | 7.7 | 0.0823 |
| Comparative Example 7 | 103 | 6.3 | 73.4 | 8.4 | 83.7 | 94.2 | 5.8 | 0.0874 |
| Comparative Example 8 | 83 | 6.9 | 45.9 | 8.9 | 56.8 | 90.5 | 9.5 | 0.0845 |
| Comparative Example 9 | 101 | 7.2 | 68.4 | 6.5 | 92.9 | 87.9 | 12.1 | 0.0524 |

| | Tape Characteristics | | | | | | | | | |
|---|---|---|---|---|---|---|---|---|---|---|
| | Lower Layer Evaluation | | | Multilayer Evaluation | | Durability | | | | | |
| | Viscosity (mPa·s) | Surface Roughness (Å) | Glossiness | Surface Roughness (Å) | Output (dB) | Steel-ball Slide (μm) | No. of Passes | Friction Coefficient | Dispersion FR Evaluation | Medium surface evaluation | Head dirt |
| Example 1 | 74 | 52 | 203 | 41 | 1.8 | 145 | >1500 | 0.15 | ○ | ○ | ◎ |
| Example 2 | 72 | 50 | 213 | 53 | 1.6 | 140 | >1500 | 0.25 | ○ | ○ | ◎ |
| Example 3 | 78 | 65 | 197 | 62 | 1.5 | 150 | >1500 | 0.22 | ○ | ○ | ○ |
| Example 4 | 81 | 72 | 178 | 69 | 1.6 | 130 | >1500 | 0.28 | ○ | ○ | ○ |
| Example 5 | 97 | 83 | 174 | 80 | 1.1 | 140 | >1500 | 0.14 | ○ | ○ | ◎ |
| Example 6 | 86 | 75 | 167 | 72 | 1.5 | 145 | >1500 | 0.17 | ○ | ○ | ◎ |
| Example 7 | 103 | 92 | 161 | 89 | 1.0 | 135 | >1500 | 0.23 | ○ | ○ | ○ |
| Example 8 | 85 | 71 | 180 | 68 | 1.7 | 130 | >1500 | 0.31 | ○ | ○ | ○ |
| Example 9 | 113 | 95 | 159 | 92 | 1.0 | 120 | >1500 | 0.32 | ○ | ○ | ○ |
| Comparative Example 1 | Tape could not be produced | | | | | | | | | | |
| Comparative Example 2 | 314 | 189 | 129 | 143 | 0.0 | 185 | >1500 | 0.44 | X | Δ | X |
| Comparative Example 3 | 423 | 231 | 76 | 239 | −2.1 | 230 | >1500 | 0.78 | X | X | X |
| Comparative Example 4 | 358 | 218 | 85 | 209 | −1.7 | 210 | >1500 | 0.62 | X | X | X |
| Comparative Example 5 | 213 | 145 | 142 | 118 | −0.2 | 170 | >1500 | 0.31 | Δ | Δ | Δ |
| Comparative Example 6 | 245 | 154 | 137 | 138 | 0.1 | 160 | >1500 | 0.63 | X | Δ | X |
| Comparative Example 7 | 256 | 165 | 129 | 142 | −0.0 | 165 | 1000 | 0.75 | X | Δ | X |
| Comparative | 249 | 342 | 83 | 213 | −3.2 | 225 | 945 | 0.82 | X | X | X |

TABLE 1-continued

| | | | | | | | | | | | |
|---|---|---|---|---|---|---|---|---|---|---|---|
| Example 8 Comparative Example 9 | 158 | 129 | 150 | 103 | 0.5 | 180 | >1500 | 0.21 | ○ | ○ | ○ |

Head Dirt
⊚ Almost no dirt
○ Some dirt, but not a problem
Δ Enough dirt to cause problem
X Much dirt
Dispersibility
○ Good dispersibility, almost no agglutination (less than 1% in field of view)
Δ Less than 5% agglutination, but high for dispersibility
X More than 5% agglutination, degrading dispersibility The results shown in Table 1 and FIGS. 1 and 2 reveal that hematite having a maximum pore volume value (the highest pore size concentration) that is within the range of 0.01 μm to 0.05 μm in the pore diameter range of 0.0018 μm to 0.1 μm, has excellent dispersibility that provides good tape characteristics. However, when the maximum value falls in a pore diameter range that is below 0.01 μm, as in the case of Comparative Example 2, dispersibility is poor, so the tape characteristics are also poor. Similarly, when the cumulative pore volume within the pore diameter range of 0.0018 μm to 0.01 μm accounts for not more than 30% of the cumulative pore volume within the pore diameter range of 0.0018 μm to 0.1 μm, as in the hematite of Examples 1 to 9, dispersibility is good, resulting in good tape characteristics, while when said cumulative pore volume exceeds 30%, as in Comparative Examples 1 to 4, dispersibility is degraded.

Compared to Comparative Example 3, which has a cumulative pore volume value in the pore diameter range of 0.0018 μm to 0.01 μm that exceeds 30%, taking the cumulative pore volume value within the pore diameter range of 0.0018 μm to 0.1 μm as 100%, Example 1, which does not exceed 30%, as shown FIG. 2, has better dispersibility and therefore better tape characteristics.

Also, compared to Comparative Example 1 containing no P, in which the hematite became sintered, degrading the dispersibility and making it unsuitable for use, sintering was prevented in Examples 1 to 8 having a P content of from 0.1 to 5 wt %.

Differences based on temperature elevation rate can be seen by comparing Example 1 and Comparative Example 5. The Comparative Example, with the slower temperature elevation rate, exhibited a large pore diameter value that degraded surface glossiness and other such values that are an indication of dispersibility.

A comparison of Example 1 and Comparative Example 3 shows the effect of changing atmospheres. It can be seen for usage of air atmosphere in the baking that there is a properties improvement effect when the medium is formed. As a result, it can be seen that pores could be adjusted to an appropriate size by adding steam to the atmosphere.

A comparison of Comparative Example 4 and Example 1 makes it possible to compare whether or not to add steam after the temperature is elevated. Here too, the tendency is the same. It can be seen that the particle pores become smaller, adversely affecting the viscosity of the coating material and the surface smoothness of the coated medium.

A comparison of Comparative Examples 2 and 3 reveals the effect of water content during baking. When baking is carried out in the presence of water content, there are fewer small pores and the viscosity of the coating material is lower, so the surface smoothness of the resulting medium tends to be improved.

A comparison of Comparative Examples 1 and 8 shows the effect that the particle P content has on characteristics. When the P content is too low as Comparative Examples 8, the characteristics are better than those of Comparative Example 1 which contains no P, but are still insufficient, and the characteristics of the resulting medium are markedly inferior.

In the case of Example 9 there is no P, but modifying the conditions provides some relative improvement, although friction is slightly higher compared to examples containing P. Thus, while P does have a major effect on characteristics, it cannot be called an essential component element, since it can be seen that improvement can be achieved by adjusting the manufacturing conditions.

Based on the foregoing comparisons, it can be understood that adjusting the timing of the introduction of gas and steam, and the temperature elevation rate during baking have a composite effect, so that while it is not essential that all conditions be satisfied, satisfying all conditions makes it possible to obtain even better particles.

This invention can be applied nonmagnetic powder for coated type multilayer magnetic recording media used for home video tapes, data storage and other such applications.

What is claimed is:

1. Nonmagnetic powder for a magnetic recording medium that has an acicular iron compound as its principal component and exhibits a maximum pore volume value within a pore diameter range of 0.01 μm to 0.05 μm, with respect to a pore diameter within the range 0.0018 μm to 0.1 μm, in which the relationship between pore diameter and pore volume is calculated by a mercury injection method.

2. The nonmagnetic powder according to claim 1 which exhibits a cumulative pore volume value in a pore diameter range of 0.0018 μm to 0.01 μm that is not more than 30% of the cumulative pore volume value in the pore diameter range of 0.0018 μm to 0.1 μm.

3. The nonmagnetic powder according to claim 1, in which the powder contains 0.1 to 5 wt % P.

4. The nonmagnetic powder according to claim 1, in which the powder contains a total of 0.1 to 10 wt % of at least one of Al and Si.

5. The nonmagnetic powder according to claim 1, in which the powder contains 0.1 to 10 wt % of rare earth elements including Y.

6. A magnetic recording medium comprising the nonmagnetic powder of claim 1.

7. A method of manufacturing the nonmagnetic powder of claim 1, comprising baking iron oxy hydroxide in an atmosphere and introducing steam into the baking atmosphere wherein during a step of elevating the temperature to bake the iron oxy hydroxide and transform it to the acicular iron compound, the temperature is elevated at a rate of at least 50° C./min.

8. The method of claim 7, wherein the baking and transforming steps produce α-ferric oxide.

* * * * *